United States Patent [19]

Martin

[11] 4,242,911
[45] Jan. 6, 1981

[54] ULTRASONIC MEDICAL DIAGNOSTIC APPARATUS AND METHOD

[75] Inventor: Henry E. Martin, South Windsor, Conn.

[73] Assignee: Mediscan, Inc., South Windsor, Conn.

[21] Appl. No.: 8,331

[22] Filed: Feb. 1, 1979

[51] Int. Cl.³ .............................. G01N 29/04
[52] U.S. Cl. .............................. 73/620; 73/626
[58] Field of Search .............. 73/620, 625, 626, 633; 128/660

[56] References Cited

U.S. PATENT DOCUMENTS

| | | | |
|---|---|---|---|
| 4,058,003 | 11/1977 | Macovski | 73/620 |
| 4,137,777 | 2/1979 | Haverl et al. | 73/620 |
| 4,138,895 | 2/1979 | Mezrich | 73/626 |

Primary Examiner—Anthony V. Ciarlante
Attorney, Agent, or Firm—Fishman and Van Kirk

[57] ABSTRACT

The non-invasive testing of soft body tissue is accomplished with the use of a beam of ultrasonic energy which may be focused at varying depths in a patient. The energy content of the ultrasound beam is varied as a function of depth of focus to thereby employ the minimum energy required for proper resolution at the chosen examination depth. Signals commensurate with echoes received by a transducer having an array of coaxial annular electrodes thereon are combined in a manner which results in a good signal-to-noise ratio and minimum attenuation thereby improving the quality of the information derived from the examination procedure.

25 Claims, 3 Drawing Figures

FIG. 1C

ULTRASONIC MEDICAL DIAGNOSTIC APPARATUS AND METHOD

BACKGROUND OF THE INVENTION

(1) Field of the Invention

The present invention relates to non-destructive testing and particularly to the non-invasive examination of soft tissue and body organs. More specifically, this invention is directed to medical ultrasonic equipment and particularly to pulse-echo body scanners having improved output signal resolution and/or capable of being focused at variable depths with the examining beam energy content being varied with depth of focus. Accordingly, the general objects of the present invention are to provide novel and improved methods and apparatus of such character.

(2) Description of the Prior Art

While not limited thereto in its utility, the present invention is particularly well suited for use in diagnostic medicine. For a general discussion of ultrasonic diagnostic techniques and instruments, reference may be had to U.S. Pat. No. 4,137,777 which is assigned to the assignee of the present invention. The disclosure of said U.S. Pat. No. 4,137,777 is incorporated hereby by reference.

The aforementioned patent discloses an ultrasonic body scanner wherein the examining beam may be focused about a natural focal length; the natural focal length being determined by the geometry of the beam generating transducer. Thus, in accordance with the referenced patent, when an area of particular interest is noted during an examination, enhanced detail of that area may be obtained by rescanning and changing the focal length of the beam so that the examining beam will be focused at different depths within the patient's body. The variation in focus of the examining ultrasound beam is accomplished electrically and, in accordance with one embodiment, the transducer is of the single crystal coaxial array type. By way of example, the transducer may comprise a piezoelectric crystal shaped to have a natural focal length and having a first surface thereof coated with a conductive material and a second opposite surface thereof provided with a plurality of coaxial annular electrodes. The apparatus disclosed in the referenced patent employs the same crystal for beam generation and as a receiver which transduces echoes from within the test body into electrical signals for subsequent processing and display.

The apparatus and method of referenced U.S. Pat. No. 4,137,777 was a significant step forward in the art of diagnostic ultrasonics. Nevertheless, there has been a desire to provide enhanced image quality by controlling both the delivery of ultrasonic energy to a patient and by improving the processing of signals commensurate with received echoes. There has also been a desire to minimize the energy content of the pulses of ultrasonic energy delivered to a patient to a level commensurate with an acceptable echo related signal-to-noise ratio. Since signal attenuation is a function of path length, those prior art ultrasonic devices which were capable of being varied in focal length selected a beam energy content which would permit usable information to be derived from the maximum depth of focus. This, of course, resulted in excessive energy at lesser depths of focus.

In the prior art, when using either a transducer array or a single transducer with an electrode array thereon, it has been common practice to sum all of the electrical signals provided by the transducers or transducer in response to received echoes in a conventional summing circuit. That is, signals commensurate with the echoes received at the transducer or transducer array were directly coupled, via a resistive network, to the signal processing circuitry. This form of signal coupling results in comparatively high attenuation and thus prior ultrasonic diagnostic apparatus have been characterized by relatively poor signal-to-noise ratios.

SUMMARY OF THE INVENTION

The present invention overcomes the above briefly discussed and other deficiencies and disadvantages of the prior art and in so doing provides novel and improved apparatus and techniques for the non-invasive and non-destructive testing of objects, particularly soft human body tissue and organs, with ultrasonic energy. While not limited thereto in its utility, the apparatus and techniques of the present invention are particularly well suited for use in, and will be described with relation to, an ultrasonic body scanner employing a single piezoelectric crystal as both beam generator and receiver. This single crystal transducer will preferably be characterized by having a natural focal length and will also be characterized by being of the coaxial phased array type; i.e., a plurality of annular electrode rings will be provided on at least one surface of the crystal.

In accordance with one embodiment of the invention, the ultrasound beam generator is electrically focused by means of controlling the time of the application of drive signals to the electrode rings of the transducer. The energy content of the beam will be varied with focus in such a manner as to increase the excitation power delivered to the transducer, and thus also the energy content of the bursts of ultrasound energy, with increases in beam focal length.

In accordance with another embodiment of the invention, signal resolution is improved and energy input to a patient is minimized by shortening the length of the pulses of energy which define the scanning ultrasound beam. Thus, rather than generating transducer drive voltages which increase gradually to a maximum amplitude and thereafter decrease gradually pursuant to a desired wave shape, the transducer is excited with a constant magnitude sine wave drive signal for a preselected period.

Pursuant to another embodiment of the invention, signals commensurate with received echoes are transformer coupled to the signal processing circuitry in a manner which minimizes attenuation and maximizes the signal-to-noise ratio. Specifically, currents corresponding to the voltages generated by the transducer crystal and applied to the individual electrode rings of a phased coaxial array are caused to flow through the primary windings of individual transformers. The secondary windings of these transformers are connected in series and the voltage induced in these secondary windings are thus added and, after appropriate preconditioning, amplified and displayed.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figure 1A:
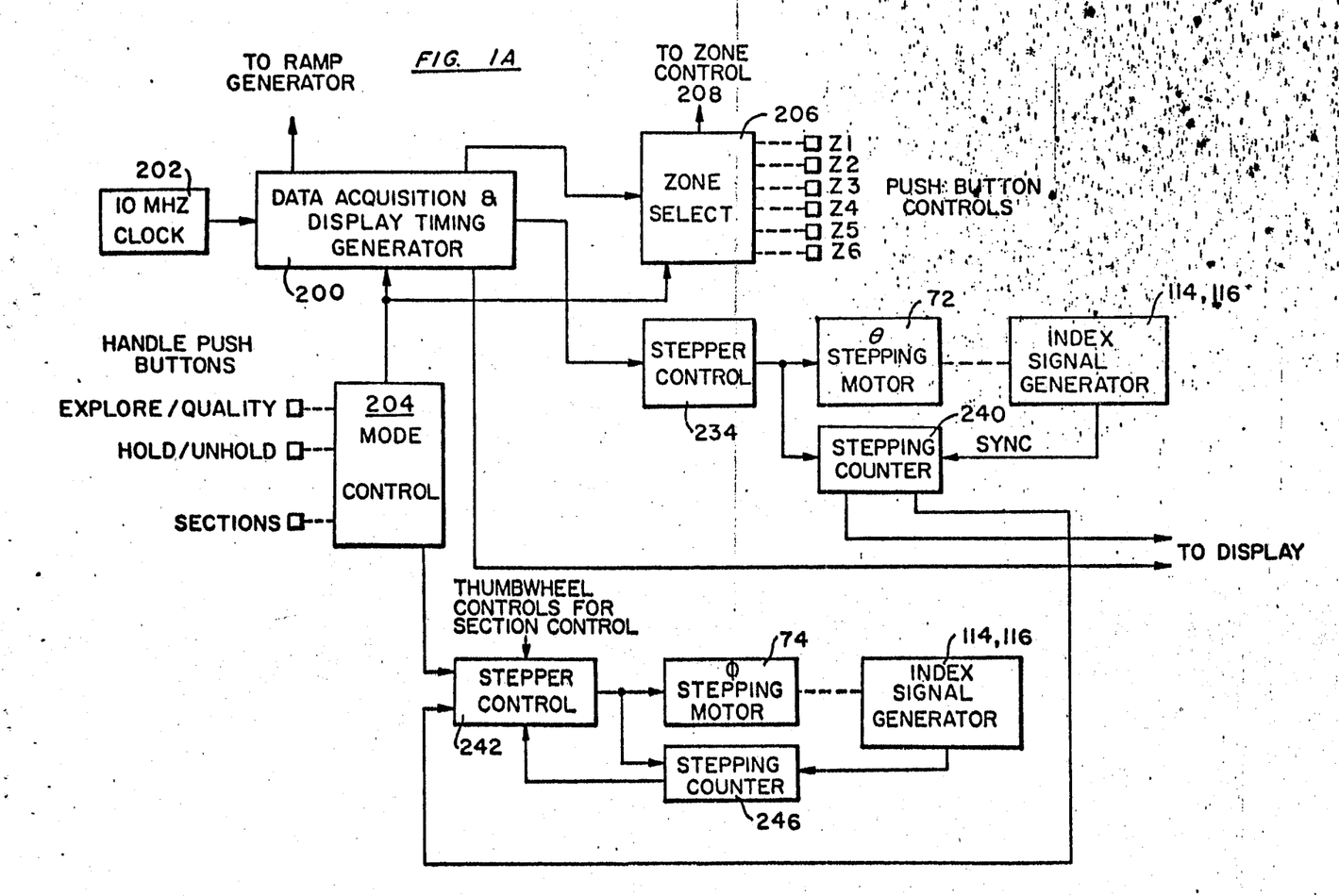
FIGS. 1A, 1B and 1C represent, partially in block diagram form and partially in electrical circuit schematic diagram form, control circuitry for ultrasonic diagnostic apparatus in accordance with a preferred embodiment.
Figure 1B:
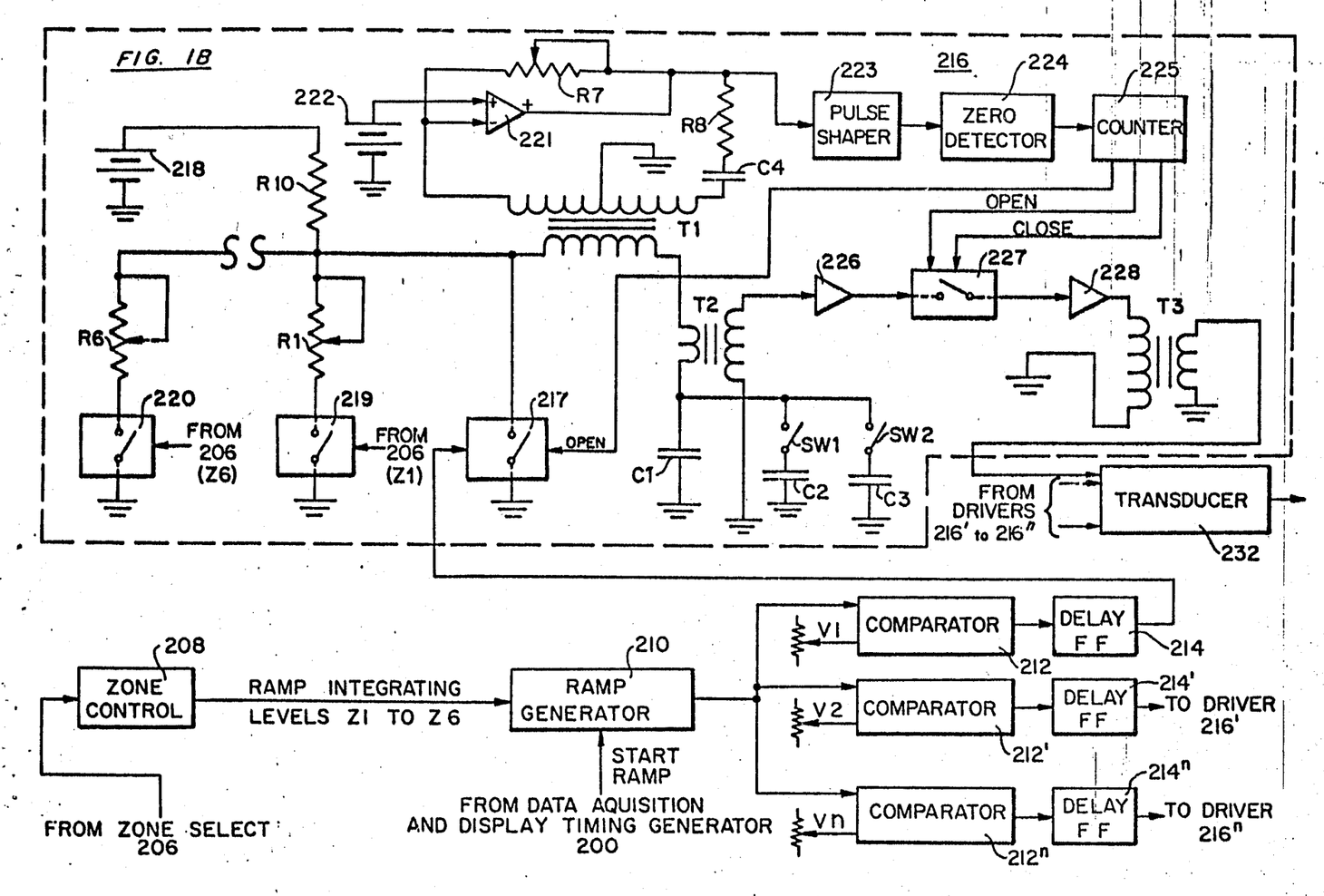
Figure 1C:
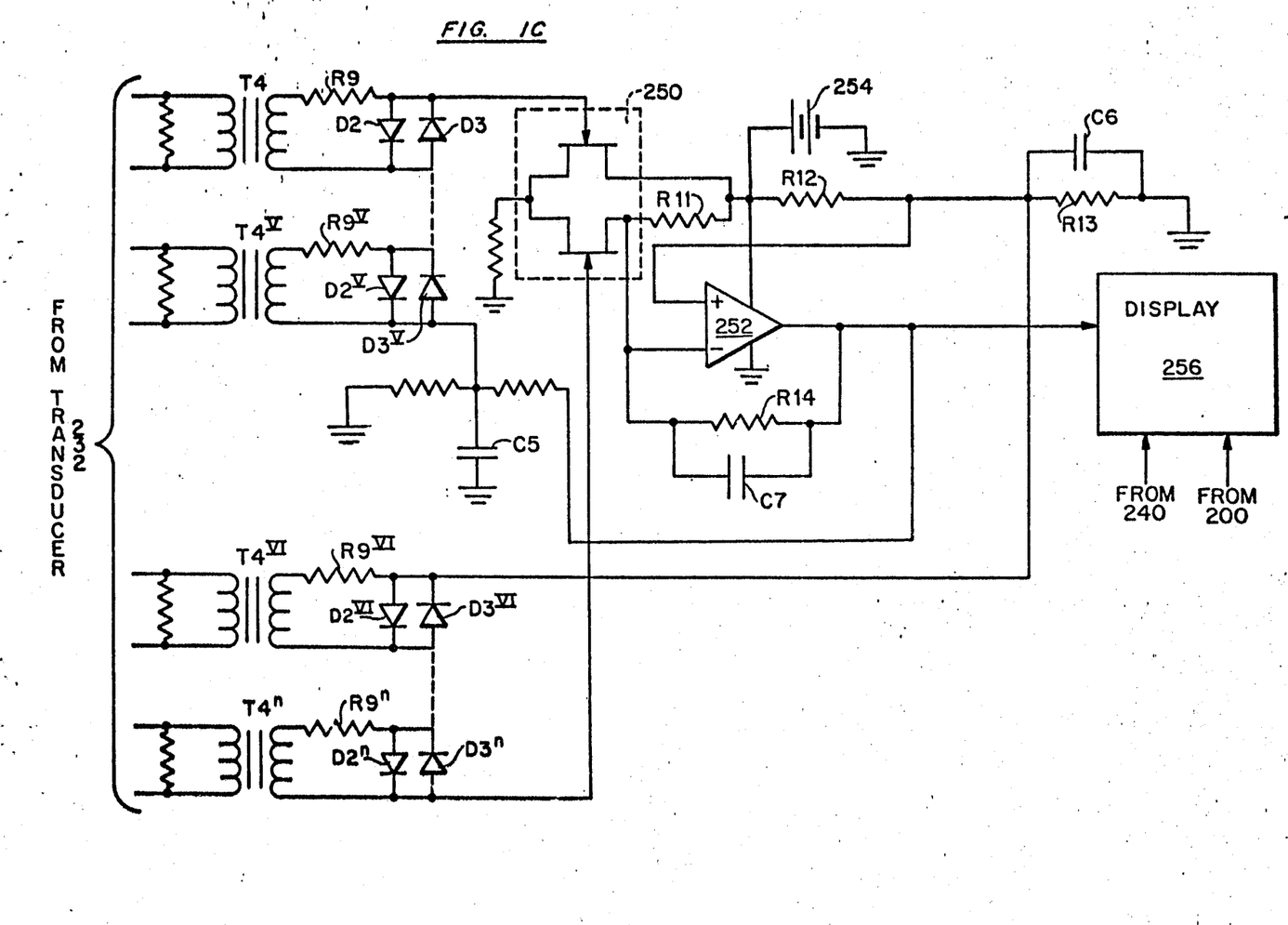

For a general description of an ultrasonic body scanner of the type with which the present invention may be employed, reference may be had to FIGS. 1 and 5 of referenced U.S. Pat. No. 4,137,777. A single crystal transducer of the coaxial phased array type, with which the present invention is particularly well suited for use, is shown in FIGS. 4A and 4B of the referenced patent. As represented in FIGS. 2 and 5 of U.S. Pat. No. 4,137,777, the transducer crystal is preferably shaped so as to have a natural focal length. It should thus suffice to point out that, by means of a movable mirror, a beam of ultrasonic energy generated by the transducer (herein 232) may be caused to scan in multiple parallel planes or sectors.

With reference now to the drawing, and bearing in mind that the disclosed embodiment is intended for operation with a single crystal transducer having the forwardly facing surface thereof completely covered with electrically conductive material and having a plurality of concentric ring-type electrodes on the rear surface thereof, the control system includes circuitry for "firing" the electrode rings on the transducer crystal in the proper sequence so as to achieve a preselected depth of focus of the generated ultrasonic "beam". The "beam" is, of course, defined by periodic bursts or pulses of ultrasound energy. The control circuitry of the disclosed embodiment has the capability of selecting six zones or depths of focus with focal length Z3 being the natural focus of the shaped transducer crystal. The number of electrode rings on the rear surface of the piezoelectric crystal will not necessarily be the same as the number of obtainable beam focal lengths and in one reduction to practice the crystal had eleven concentric electrode rings thereon. When drive signals are simultaneously applied to all eleven electrode rings, the resulting beam of ultrasonic energy will be focused at the natural focal length Z3 of the transducer. The control circuitry of the preferred embodiment of the invention also includes means for selecting different modes of operation, means for controlling the scanning of the ultrasonic beam by imparting motion to the mirror disposed in the beam path intermediate the transducer and the body to be examined and means for processing and displaying and/or recording signals commensurate with received echoes.

The various subsystems of the control circuitry are responsive to the outputs of a data acquisition and display timing generator 200. Timing generator 200 receives, as input signals, the output of a clock pulse generator 202 and a command signal from a mode control selector circuit 204. Timing generator 200 divides down the output of clock 202 to provide, in the proper sequence, timing pulses which control the operation of a first ramp voltage generator 210 as well as further ramp voltage generators in the display circuitry (see FIGS. 8C and 8D of referenced U.S. Pat. No. 4,137,777). Timing generator 200 also produces gating signals, corresponding to the six possible depths or zones of focus, for delivery to a zone select circuit 206. These gating signals are in the form of six sequential control pulses having the same width.

The mode control circuit 204 may comprise a "memory" including a flip-flop circuit which will be set depending upon the mode of operation selected by the operator. The "EXPLORE/QUALITY" selector enables the operator to vary the mode of scanning between a real time or "EXPLORE" mode, wherein the beam is scanned at a first and relatively fast rate, and a "QUALITY" mode wherein the ultrasonic beam is scanned at a second slower rate. Thus, after determining an area of interest in real time, a "QUALITY" scan along the same plane may be initiated. The "HOLD/UNHOLD" control, which will not be further described herein, may be energized to stop the loading of additional information into storage devices which comprise the display circuitry portion of the apparatus. The "SECTIONS" control comprises an enabling switch which provides a gating signal which is utilized for the control of a stepping motor 74 to produce, in the manner to be briefly described below, the multiple sector scan mode of operation.

Assuming that the "EXPLORE" mode has been selected by the operator, and the control system has been initialized in the manner known in the art, timing generator 200 will provide sequential gating signals to the zone select circuit 206 as described above. Zone select circuit 206 may also receive, as a second input, a signal generated by operation of one of a plurality of push button type controls; there being a separate push button for each of the six possible beam focal lengths in the embodiment being described. The zone select circuit 206 includes a counter, gates and latches which provide, in response to the two inputs, a digitally coded output signal which is commensurate with the zone selector button which has been operated. This digitally coded zone signal is applied as the control input to a zone control circuit 208. Zone control circuit 208 may comprise a digital-to-analog function generator which provides a steady state output voltage having a magnitude commensurate with the selected zone.

The output voltage from zone control circuit 208 is provided as the control input to ramp voltage generator 210. Ramp voltage generator 210 also receives, from timing generator 200 as previously described, a gating signal which functions as a "start ramp" command. Ramp voltage generator 210 may comprise a conventional controllable sweep voltage generator which produces a saw-tooth voltage having a slope which varies in accordance with the level of the control input; i.e., the slope of the output voltage provided by ramp voltage generator 210 is determined by the magnitude of the input to the ramp voltage generator from the zone control circuit 208.

The sweep voltage generated by ramp voltage generator 210 is delivered as the input to a plurality of identical voltage comparator circuits 212; the number of comparators being commensurate with the number of electrode rings on the transducer and the comparators being indicated by reference numerals 212-212$^n$. Separate selected bias voltages, from sources indicated V1-Vn, are delivered to each of voltage comparators 212. The bias voltages are compared with the instantaneous magnitude of the ramp voltage from generator 210 in the respective comparators and, when the ramp or sawtooth voltage equals the comparator bias level, the comparators will individually deliver gating signals to an associated one shot delay multivibrator 214. Each of multivibrators 214 has a preselected period and, as will be obvious from the preceding discussion, the relative times of gating multivibrators 214 will be a function of the slope of the ramp voltage provided by generator 210 and the trailing edges of the output pulses provided by multivibrators 214 will be a function of both gating time and the preselected period of the multivibrators.

Each of the delay multivibrators 214 is connected to a separate drive circuit 216. In the embodiment being described, where there are eleven electrode rings on the transducer crystal, there will be eleven identical drive circuits 216. The purpose of the drive circuits 216 is to provide a pulse of electrical energy at the proper time and at a preselected frequency, for example 2.5 MHz, and to vary the magnitude of these pulses as a function of the output of zone control circuit 206. A switch device 217 will be responsive to the trailing edge of the output pulse provided by its associated delay multivibrator 214. The switch devices 217 will normally be in the "open" state and, in response to the delay multivibrator output pulses, will be "closed" thus establishing a discharge path to ground for a capacitor C1. Capacitor C1 will have been previously charged, from a direct current source 218 via the series connected primary windings of transformers T1 and T2. Capacitor C1 and the primary windings of transformers T1 and T2 cooperate to define a series resonant circuit. Upon the "closing" of switch device 217, a sine wave voltage, initially having a magnitude commensurate with the level to which capacitor C1 has been charged, will be induced in the secondary winding of transformers T1 and T2. The switch device 217 will remain in the "closed" condition until a reset pulse, generated in the manner to be described below, is received. The series resonant circuit including capacitor C1 will attempt to "ring" whereby a plurality of cycles of the sine wave voltage with progressively decreasing magnitude would be induced in the transformer secondary windings. However, in the manner to be discussed below, the peak amplitude of the current flowing through the primary winding of current transformer T2 is constrained to be constant during the periods that switch device 217 is "closed". The switch device 217 may, for example, comprise a CMOS solid state bi-directional switch such as the type CA4016 manufactured by Radio Corporation of America. A current limited resistor R10 will prevent high current through switch device 217 when the switch is in the "closed" state.

It is to be noted that, by means of electronic switching circuits such as are indicated schematically by switches SW1 and SW2, additional capacitance, as indicated at C2 and C3, may be added to the series resonant circuit so as to change the frequency of "ringing" thereof. The additional capacitance will be connected in parallel with capacitor C1 in the interest of changing the frequency of the energizing signals delivered to the transducer 232 to enable selection of the drive frequency which will achieve the best resolution or maximum depth of penetration of the ultrasound energy. The maximum depth from which usable echoes will be returned is a function of the attenuation of the ultrasound energy and attenuation rate is, in turn, a function of frequency. When the apparatus has the capability of changing transducer excitation frequency, a low Q crystal in a highly damped system is employed. Switches SW1 and SW2 will, in actual practice, typically be electronic switches which are remotely operated by means of suitable controls on a control panel for the diagnostic apparatus.

The level to which the capacitance in the series resonant circuit will be charged, and thus the exciting power delivered to transducer 232 and the energy content of the generated ultrasound beam, will be controlled by means of potentiometers R1-R6; there being a separate potentiometer for each of the focus zones which may be selected by means of zone control circuit 208. One of these power level selector potentiometers will always be connected in series with current source 218 by means of a switching circuit such as indicated schematically at 219 and 220. One of the six switching circuits, including circuits 219-220, will be operated to establish a path to ground from the associated potentiometer in synchronism with selection of a focus zone; i.e., a beam of focal length; by means of zone select circuit 206. Considering only an "EXPLORER" mode of operation, the switching circuits 219, 220 could be merely mechanical switches ganged with the push button controls of zone select circuit 206. In a fully automatic apparatus, wherein the zones are automatically changed during a "QUALITY" scan mode, switches 219,220 would be electronic switches and associated decoders whereby the switches are individually responsive to the coded output signal provided by zone select circuit 206.

A pulse oscillator drive circuit, including an operational amplifier 221, is connected across the secondary winding of transformer T1. A potentiometer R7 is connected between the inverting input and the output terminals of amplifier 221 and functions as a gain control. An RC circuit, comprising resistor R8 and capacitor C4, is connected between the output terminal of amplifier 221 and one end of the center tapped secondary winding of transformer T1. The other end of the secondary winding of transformer T1 is connected to the inverting input to amplifier 221. A bias voltage source, represented in the drawing by a battery 222, is connected to the non-inverting input of amplifier 221. The center tap of the secondary winding of the transformer T1 is grounded as is the negative terminal of bias voltage source 222. Amplifier 221, in response to the sum of the input signals at its inverting input terminal, drives sufficient current through the secondary winding of transformer T1 to sustain the oscillation of the series resonant circuit which includes the primary winding of transformer T1. Capacitor C4 is a direct current blocking capacitor while resistor R8 serves to limit the current through amplifier 221 to a safe level. In summary, potentiometer R7 is adjusted so as to insure that the operational amplifier 221 feeds enough power back to the secondary winding of transformer T1, the power thus being coupled to the transformer primary winding, to sustain the oscillation of the series resonant circuit defined by the primary winding of current transformer T2 and the capacitance in series therewith. In accordance with a preferred embodiment of the present invention, it is desired that constant power be delivered to the transducer until such time as the switching circuit 217 is returned to the "open" state.

The signal appearing at the output of operational amplifier 221 is also applied to the input of a pulse shaping circuit 223. The pulse shaper 223 converts the sine wave output signal of amplifier 221 into a square wave synchronized with the amplifier output voltage. Since an inductive circuit is involved, the voltage at the input to pulse shaper 223 will lead the current by up to 90°. The output of pulse shaper 223 is applied as the input to a zero crossing detector 224 which provides a series of pulses commensurate with the passing of the sinusoidal series resonant circuit voltage through the zero voltage level. The output pulses provided by zero crossing detector 224 are delivered as the inputs to a binary counter 225. Counter 225 counts the number of half cycles of the voltage resulting from oscillation of the series resonant circuit including the primary winding of transformer T2 and provides gating control signals which, after a preselected period, terminate the delivery of energy to the transducer 232 and cause switch device 217 to revert to the "open" state so that the capacitance in the series resonant circuit can be recharged. Thus, in a typical case, counter 225 will provide two independent outputs at the same preselected count which will respectively cause the "opening" of switch device 217 and remove the drive from transducer 232. A further output from counter 232, commensurate with a lower count which typically will be one cycle of the series resonant circuit, will connect the drive to transducer 232.

It is to be observed that the series resonant circuits in drivers 216 will typically have a natural frequency of approximately 2.5 MHz. Due to propagation delay through the switches at this frequency, generation of gating signals by counter 225 in synchronism with the zero crossing of the voltage will in fact result in the switches closing at approximately the zero crossing of the lagging current. This will remain true even if the frequency of oscillation is changed by adding capacitance to the series resonant circuit since, from a practical point of view, no undesirable effects result from opening the switching circuits within 20° to 30° of the zero crossing point of the current.

The signal induced in the secondary winding of current transformer T2 is amplified in a preamplifier 226. The output of preamplifier 226 is coupled, via a switching circuit 227, to a power amplifier 228. Switching circuit 227, which may be identical to switching circuit 217, is operated to the "closed" state by the first output of counter 225, as described above, and is opened by the second higher output from counter 225 simultaneously with the "opening" of switch device 217.

The output of each of power amplifiers 228 flows through the primary winding of a further transformer such as indicated at T3. Transformer T3 is thus one of eleven identical transformers by which power is coupled to the electrode rings on transducer 232. A first end of the secondary winding of transformer T3 is connected to one of the ring electrodes of transducer 232 with the other end of the secondary winding of transformer T3 and the conductive coating on the surface of the transducer crystal from which the ultrasonic energy is propagated being connected to a common point. In actual practice, the signal passed by switching circuit 227 will be transformer coupled to power amplifier 228, which may be a multi-stage amplifier, and the output power from amplifier 228 is maximized through the use of VMOS field effect transistors. Power amplifiers 228 will typically be push-pull circuits with output transformers T3 having center-tapped primary windings.

The voltages which appear on the electrode rings when accoustical energy is imposed on the transducer crystal are applied across the primary windings of individual output transformers T4–T4". The resulting current flow through the transformer T4 primary windings causes voltages to be induced in the secondary windings thereof. The transformer secondary windings are electrically connected in two groups with the windings of each group being connected in an additive series fashion. Thus, by way of example, the secondary windings of the transformers associated with transducer rings 1 through 6 will be connected in series, whereby the signals induced therein will be added, and the secondary windings of the transformers associated with rings 7–11 on the transducer crystal will also be connected in series. A pair of oppositely polarized diodes D2 and D3 are connected in parallel with each of the secondary windings of transformers T4. These diodes, in conjunction with associated current limiting resistors R9 and the leakage reactance of the transformers, limit the transformer T4 secondary voltages during the transmit mode. Restated, in the manner known in the art, the diodes D2 and D3 act as switches in a current limiting network to prevent the transducer drive signals from appearing at the input to the receiver circuitry during drive excitation of the transducer. During the receive mode, however, the signals of interest are of lower amplitude than the contact or work function potential of the diodes and thus the diodes D2 and D3 are not switched into the conductive state. The capacitor C5 defines an alternating current ground for a first group of series connected transformer T4 secondary windings while capacitor C6 performs this same function for the other group of windings.

The summed signals from the two groups of transducer electrodes are respectively applied to the inputs of a differential amplifier 250. In the disclosed embodiment, amplifier 250 includes a pair of field effect transistors; FET's being selected because of their low noise characteristics. The series connected transformer windings in each group are connected such that the input signals to differential amplifier 250 will be of opposite polarity. Thus, the output of differential amplifier 250 will be the sum of the signals induced in the eleven secondary windings of transformers T4.

The output signal from differential amplifier 250 is applied to the inverting input of an operational amplifier 252. Amplifier 252 functions to bias amplifier 250 such that the field effect transistors will at all times operate in their linear regions. Thus, the direct current output of differential amplifier 250, as developed across resistor R11, is sensed and compared with a reference voltage provided by a source comprising current supply 254 and a voltage divider defined by resistors R12 and R13. The reference voltage, measured at the junction of resistors R12 and R13, is applied to the non-inverting input of amplifier 252 and, via a first group of transformer T4 secondary windings, to a first input of differential amplifier 250. Any d.c. error signal which appears at the output of operational amplifier 252 will be fed back through the second group of transformer T4 secondary windings to the other input to differential amplifier 250, to force the system into equilibrium. Resistor R14 and capacitor C7 are a stabilizing network for operational amplifier 252. The a.c. output of amplifier 252 is delivered as the information bearing input to display circuit 256.

To briefly discuss the means by which the scanning of the beam provided by transducer 232 is controlled, a "mirror", not shown, is positioned for movement in the path of the beam provided by the transducer. There will be a transmission medium, deareated water for example, in which the propagation surface of the transducer and the face of the mirror are immersed. The position of the mirror is controlled by a pair of stepping motors 72 and 74. Motor 72 will cause the mirror to move so as to scan the beam along a line or sector while motor 74 will cause the scanning lines to be displaced in the transverse direction. An output of the timing generator 200 functions as the control input to control circuit 234 which provides the control signals for stepping motor 72. The stepper motor control 234 may comprise a commercially available circuit which causes the rotor of stepping motor 72 to move through a predetermined angle in response to each input signal received thereby. When in the "EXPLORE" mode, motor 72 will be advanced by one step for each sweep of ramp voltage generator 210. In the "QUALITY" mode, as a result of the control exercised over the output of timing generator 200 by mode control 204, motor 72 will be stepped with every sixth firing of transducer 232. The output shaft of stepping motor 72 is mechanically coupled to an index signal generator 114, 116. The electrical output of index signal generator 114, 116 is fed back as a synchronizing signal to a stepping counter 240. Counter 240, since the number of counts required to make a complete sector scan are known, is able to provide information commensurate with the angle of deflection of the mirror which forms an input to display circuit 256.

When multiple plane scanning is desired, the operator will operate the "SECTIONS" control associated with mode control 204 whereby an enabling signal is delivered to the controller 242 for motor 74. Motor controller 242 also receives an "end of sector" signal from the stepping counter 240 associated with motor 72. A further input to stepper motor control 242 is derived from a counter 246 and an additional input signal may be manually generated by thumb wheel switches controlled by the operator; these manually selectable input signals permitting control over the spacing between the multiple planes or sectors. Stepper motor controller 242, in response to the enabling signal from mode control 204 and the initiate or "end of sector" signal from stepping counter 240, will command stepping motor 74 to advance in steps having a magnitude as determined by the setting of the operator controlled thumb wheel switches. The index generator 114, 116 provides a synchronizing signal which may be fed back to counter 246. Counter 246 also receives the motor control pulses from the motor control 242. Counter 246 provides a signal indicative of the position of the rotor of motor 74 which is commensurate with the angular position of the mirror in a direction transverse to the angular position information provided by counter 240.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. In apparatus for the testing of objects with ultrasonic energy, the apparatus including a transducer for generating a beam of ultrasonic energy and means for coupling the generated beam into a test object, the apparatus further comprising means for receiving echoes from within the test object and displaying information commensurate with the received echoes, the improvement comprising:
   means for varying the focal length of the generated beam of ultrasonic energy so as to facilitate examination of differing depths within the test object; and
   means coupled to said focal length varying means for varying the power emitted by the transducer as a function of focal length.

2. The apparatus of claim 1 wherein the transducer is a single piezoelectric crystal having an array of annular coaxial electrodes on at least a first surface thereof and wherein said focal length varying means comprises:
   means for generating gating signals having a relationship in time commensurate with a time of application of a drive signal to each electrode which will achieve the desired focal length, there being an individual gating signal for each electrode;
   oscillator means, said oscillator means generating a plurality of transducer drive signals for application to individual to said electrodes; and
   switch means responsive to said gating signals for applying said drive signals from said oscillator means to the transducer electrodes.

3. The apparatus of claim 2 wherein said oscillator means includes:
   means for producing alternating signals at a preselected frequency and maximum amplitude, said alternating signal producing means being commensurate in number with the transducer electrodes.

4. The apparatus of claim 3 wherein said power varying means comprises:
   means for generating a signal commensurate with the desired beam focal length; and
   means responsive to said signals commensurate with desired focal length for varying the maximum amplitude of the alternating signals provided by said producing means.

5. The apparatus of claim 4 wherein said alternating signal producing means each comprises:
   a sine wave generator; and
   means for exercising dynamic control over the amplitude of the output signal of said sine wave generator.

6. The apparatus of claim 4 wherein said alternating signal producing means each comprises:
   capacitor means; and
   transformer means, said transformer means and capacitor means defining a resonant circuit, said capacitor means discharging through said transformer means in response to the closing of said switch means to thereby generate a sinusoidal drive signal.

7. The apparatus of claim 6 wherein said maximum signal amplitude varying means each comprises:
   means for selectively applying voltages to said resonant circuit to vary the charge to be stored in said capacitor means.

8. The apparatus of claim 7 further comprising:
   means connected to each of said transformer means for supplying energy to said resonant circuits during periods when said switch means are in the closed state to maintain the selected maximum amplitude of the sinusoidal drive signals at a substantially constant level.

9. The apparatus of claim 2 wherein said switch means comprises:
   first switch means for energizing said oscillator means in response to said gating signals;
   second switch means for coupling oscillator means generated drive signals to the transducer electrodes; and
   means responsive to the operation of said oscillator means for controlling the closing of said second switch means and the opening of said first and second switch means.

10. The apparatus of claim 9 wherein said means for controlling said switch means in response to operation of said oscillator means comprises:
means for counting the number of cycles of the oscillator means generated signals;
means for delivering a command signal to said second switch means after a first preselected number of half cycles of said oscillator means generated signals to cause closing of said second switch means; and
means for delivering command signals to said first and second switch means after a second preselected number of half cycles of said oscillator means generated signals to cause opening of said first and second switch means, said second preselected number being greater than said first number.

11. The apparatus of claim 10 wherein said oscillator means includes:
means for producing alternating signals at a preselected frequency and maximum amplitude, said alternating signal producing means being commensurate in number with the transducer electrodes.

12. The apparatus of claim 11 wherein said power varying means comprises:
means for generating a signal commensurate with the desired beam focal length; and
means responsive to said signals commensurate with desired focal length for varying the maximum amplitude of the alternating signals provided by said producing means.

13. The apparatus of claim 12 wherein said alternating signal producing means each comprises:
a sine wave generator; and
means for exercising dynamic control over the amplitude of the output signal of said sine wave generator.

14. The apparatus of claim 13 wherein said means for exercising dynamic control over the output signals of the sine wave generators each comprise:
means for sensing the amplitude of said output signal;
means for comparing the sensed output with a reference level; and
means for feeding energy to said sine wave generator to sustain the oscillations thereof when the sensed output deviates from the reference level.

15. The apparatus of claim 14 wherein said sine wave generators each comprise:
a series resonant circuit, said resonant circuit including a capacitance and transformer means, said capacitance being discharged through said transformer means through said first switch means; and
power supply means for providing charging current for said capacitance.

16. The apparatus of claim 15 wherein said maximum signal amplitude varying means each comprise:
means for selectively varying the potential applied across said capacitance during the charging thereof.

17. The apparatus of claim 13 wherein said sine wave generators each comprise:
a series resonant circuit, said resonant circuit including a capacitance and transformer means, said capacitance being discharged through said transformer means through said first switch means; and
power supply means for providing charging current for said capacitance.

18. The apparatus of claim 17 wherein said maximum signal amplitude varying means each comprise:
means for selectively varying the potential applied across said capacitance during the charging thereof.

19. The apparatus of claim 2 further comprising:
means for varying the frequency of said oscillator means.

20. The apparatus of claim 16 further comprising:
third switch means; and
capacitor means, said third switch means being operable to connect said capacitor means in said series resonant circuit to thereby vary the frequency of the ultrasound energy delivered to the test object.

21. In apparatus for the non-invasive and non-destructive testing of objects with ultrasonic energy, the apparatus including a transducer for generating a beam of ultrasonic energy and means for coupling the generated beam into a test object, the apparatus further including means for receiving echoes commensurate with the transmitted beam intercepting interfaces between regions within the object having different impedance to the ultrasonic energy, the echoes being received in a plurality of spacially displaced coaxial regions, the receiving means simultaneously providing a plurality of output signals commensurate with the ultrasonic energy received at the plural coaxial locations, the apparatus further comprising means for processing and displaying information commensurate with the output signals, the improvement comprising:
means for summing the output signals from a first plurality of said coaxial locations;
means for summing the output signals from the remainder of said coaxial locations;
differential amplifier means responsive to the output signals provided by said summing means for providing an information bearing signal having a magnitude commensurate with the total of said summing means output signals; and
means for delivering said information bearing signal from said differential amplifier means for processing and display.

22. The apparatus of claim 21 wherein the receiving means comprises a single crystal transducer having a plurality of coaxial annular electrodes on at least one side thereof and wherein said summing means each comprises:
a plurality of transformers commensurate in number with the electrodes from which the portion of the output signals to be summed are derived, the primary windings of said transformers being connected to individual of said electrodes; and
means connecting the secondary windings of said transformers in series whereby the signals induced therein will be summed.

23. The apparatus of claim 22 wherein the single crystal transducer generates and receives the ultrasound energy and wherein said apparatus further comprises:
means connected to each of said transformer secondary windings to attenuate alternating current signals in excess of a predetermined magnitude whereby no alternating signals will be delivered to said differential amplifier when said crystal is functioning as an ultrasound generator.

24. The method of claim 23 further comprising:
means for dynamically biasing said differential amplifier into a linear operating range, said biasing means comparing the amplifier output signal with a reference and generating an error signal for application to a first input of said differential amplifier.

25. The method of claim 22 further comprising:
means for dynamically biasing said differential amplifier into a linear operating range, said biasing means comparing the amplifier output signal with a reference and generating an error signal for application to a first input of said differential amplifier.

* * * * *